United States Patent
Lee

(10) Patent No.: US 12,246,198 B2
(45) Date of Patent: Mar. 11, 2025

(54) EMERGENCY ESCAPE KIT

(71) Applicant: PINOSTORY CO., LTD., Seoul (KR)

(72) Inventor: Myung Won Lee, Seoul (KR)

(73) Assignee: PINOSTORY CO., LTD., Seoul (KR)

( * ) Notice: Subject to any disclaimer, the term of this patent is extended or adjusted under 35 U.S.C. 154(b) by 860 days.

(21) Appl. No.: 17/426,525

(22) PCT Filed: Jan. 29, 2020

(86) PCT No.: PCT/KR2020/001343
§ 371 (c)(1),
(2) Date: Jul. 28, 2021

(87) PCT Pub. No.: WO2020/159221
PCT Pub. Date: Aug. 6, 2020

(65) Prior Publication Data
US 2022/0105371 A1    Apr. 7, 2022

(30) Foreign Application Priority Data

Jan. 30, 2019 (KR) ........................ 10-2019-0012174
Jan. 30, 2019 (KR) ........................ 10-2019-0012175
(Continued)

(51) Int. Cl.
*A62B 23/02* (2006.01)
*A62B 3/00* (2006.01)
(Continued)

(52) U.S. Cl.
CPC .............. *A62B 23/025* (2013.01); *A62B 3/00* (2013.01); *A62B 18/08* (2013.01); *A62B 25/00* (2013.01);
(Continued)

(58) Field of Classification Search
CPC ......... A62B 23/025; A62B 3/00; A62B 3/005; A62B 18/08; A62B 18/02; A62B 25/00;
(Continued)

(56) References Cited

U.S. PATENT DOCUMENTS

| 4,134,206 A | 1/1979 | Beermann |
| 5,918,372 A | 7/1999 | Materne |

(Continued)

FOREIGN PATENT DOCUMENTS

| JP | H0560472 U | 8/1993 |
| JP | 3044461 U | 12/1997 |

(Continued)

*Primary Examiner* — Tu A Vo
*Assistant Examiner* — Kelsey E Baller
(74) *Attorney, Agent, or Firm* — NKL Law; Jae Youn Kim

(57) ABSTRACT

An emergency escape kit is described, which includes: an emergency escape punch having an obstacle contact portion configured to be in close contact with an obstacle such as a glass window, and configured to shatter the obstacle by pressurizing a side thereof opposite to the obstacle contact portion located between the obstacle and the side of the emergency escape punch; and a gas mask configured to be couplable to or separable from the emergency escape punch, wherein when the gas mask is coupled to the emergency escape punch, the gas mask shields a portion of the emergency escape punch from an outside of the emergency escape punch, and when gas mask is separated from the emergency escape punch and is brought into close contact with respiratory organ of a user, the gas mask prevents external poisonous gas from flowing into the respiratory organ of the user.

14 Claims, 18 Drawing Sheets

(30) Foreign Application Priority Data

Jan. 30, 2019 (KR) .................. 10-2019-0012176
Jan. 30, 2019 (KR) .................. 20-2019-0000473

(51) Int. Cl.
*A62B 18/08* (2006.01)
*A62B 25/00* (2006.01)
*B01D 46/00* (2022.01)
*B60R 22/32* (2006.01)

(52) U.S. Cl.
CPC ..... *B01D 46/0005* (2013.01); *B01D 46/0035* (2013.01); *B60R 22/32* (2013.01); *B01D 2265/024* (2013.01); *B01D 2279/40* (2013.01); *B60R 2022/328* (2013.01)

(58) Field of Classification Search
CPC ............... B25D 2250/271; B25D 1/00; B01D 46/0005; B01D 46/0035; B01D 2265/024; B01D 2279/40; B60R 22/32; B60R 2022/328
See application file for complete search history.

(56) References Cited

U.S. PATENT DOCUMENTS

2009/0265858 A1* 10/2009 White .................. A62B 3/005
7/158
2017/0333736 A1 11/2017 Tennison et al.
2019/0016296 A1* 1/2019 Daniel .................. B60R 22/32

FOREIGN PATENT DOCUMENTS

| | | |
|---|---|---|
| JP | 10-291439 A | 11/1998 |
| JP | 2003-135615 A | 5/2003 |
| KR | 10-2010-0085601 A | 7/2010 |
| KR | 10-2012-0050809 A | 5/2012 |
| KR | 1020140042760 A | 4/2014 |
| KR | 101419649 B1 * | 7/2014 |
| KR | 10-2016-0093317 A | 8/2016 |
| KR | 20160093317 A * | 8/2016 |

* cited by examiner

EMERGENCY ESCAPE KIT

TECHNICAL FIELD

The present disclosure relates to an emergency escape kit and, more particularly, to an emergency escape kit including an emergency escape punch and a gas mask, wherein the emergency escape punch is configured to shatter an obstacle such as a glass window of a vehicle and a building during an emergency event such as fire so as to help a user escape and the gas mask is configured to filter a poisonous gas so as to minimize an injury due to the poisonous gas.

BACKGROUND ART

When an emergency event such as fire occurs in a vehicle and a building, a person can rapidly shatter an obstacle such as a glass window and escape. When fire occurs, an injury due to a poisonous gas generated from the fire should be minimized.

In order to minimize an injury during an emergency event and for a person to escape from the fire, an emergency escape kit is provided near a user so that the user can quickly use the emergency escape kit.

However, an emergency escape punch shattering an obstacle for the user to escape and a gas mask filtering a poisonous gas are separately provided in the conventional art, so it is difficult to carry the devices simultaneously and to rapidly use the devices for a user escape during an emergency event.

DISCLOSURE

Technical Problem

Accordingly, the present disclosure has been made keeping in mind the above problems occurring in the related art, and an objective of the present disclosure is to provide an emergency escape kit including an emergency escape punch and a gas mask efficiently coupled to each other so as to improve the portability of the emergency escape kit, wherein the emergency escape punch is configured to shatter an obstacle such as a glass window of a vehicle and a building during an emergency event such as fire so as to help a user escape and the gas mask is configured to filter a poisonous gas so as to minimize an injury due to the poisonous gas.

Technical Solution

In order to achieve the above objective, the present disclosure provides an emergency escape kit, the emergency escape kit includes: an emergency escape punch integrally fixed to a man-made structure by a plurality of anchor bolts, having an obstacle contact portion, at upper and lower portions thereof, configured to be in close contact with an obstacle such as an upper hinge window, and configured to shatter the obstacle by pressurizing a side thereof opposite to the obstacle contact portion located between the obstacle and the side of the emergency escape punch; and a gas mask configured to be couplable to or separable from the emergency escape punch, wherein when the gas mask is coupled to the emergency escape punch, the gas mask shields a portion of the emergency escape punch from an outside of the emergency escape punch, and when gas mask is separated from the emergency escape punch and is brought into close contact with respiratory organ of a user, the gas mask prevents external poisonous gas from flowing into the respiratory organ of the user.

The gas mask may include: a gas mask main body having an emergency escape punch receiving space therein to receive a portion of the emergency escape punch, wherein when the gas mask main body is coupled to the emergency escape punch, the gas mask main body receives a portion of the emergency escape punch in the emergency escape punch receiving space, the gas mask main body being made of an elastic material so as to receive the respiratory organ of the user and to be in close contact with the face portion of the user when the gas mask main body is separated from the emergency escape punch and is brought into close contact with the respiratory organ of the user; and a poisonous gas filtering module removably coupled to the gas mask main body and configured to perform filtering of the poisonous gas.

The poisonous gas filtering module may include: an upper filter housing having a contact frame connected to the gas mask main body to block inflow of external fluid; a lower filter housing providing a poisonous gas filter receiving space receiving a poisonous gas filter configured to filter the poisonous gas, the lower filter housing being coupled to the upper filter housing; and a water-soluble substance receiving bag arranged between the poisonous gas filter and the upper filter housing and receiving a water-soluble substance.

The upper filter housing may include: an external air flow frame arranged adjacent to an outside flat surface of the poisonous gas filter, and formed by perforating the upper filter housing so that external air flows inward through the poisonous gas filter and internal air flows outward through the poisonous gas filter; a protruding pin formed by protruding from the external air flow frame toward the lower filter housing while being spaced apart from the water-soluble substance receiving bag, the protruding pin being configured to cut the water-soluble substance receiving bag when the external air flow frame is pressurized from the outside; and an upper coupling frame connected to both the contact frame and the external air flow frame and having a recessed locking portion formed by being recessed to be lock-coupled to the lower filter housing.

The lower filter housing may include: a lower coupling frame having a protruding lock area formed by protruding toward the recessed locking portion and lock-coupled to the recessed locking portion, and having the poisonous gas filter receiving space therein; and an internal air flow frame connected to the lower coupling frame in a direction that intersects a longitudinal direction of the lower coupling frame and having an internal air flow portion for ventilation of the internal air.

The lower filter housing may include: a main body coupling portion formed by protruding outward in a multi-stepped shape from the lower coupling frame and coupled to the gas mask main body.

The gas mask main body may include: a first protrusion formed by protruding toward the poisonous gas filtering module and lock-coupled to the poisonous gas filtering module; a second protrusion formed by protruding from an end of the gas mask main body at the emergency escape punch toward a center inside the emergency escape punch receiving space and lock-coupled to the emergency escape punch; and a third protrusion formed by protruding from a portion between the first protrusion and the second protrusion toward the center inside the emergency escape punch receiving space.

The emergency escape punch may include: a punch main body; a hammer provided inside the punch main body and configured to partially protrude toward the obstacle when a side thereof opposite to the obstacle is pressurized; and a hammer support elastic body coupled to the hammer and configured to support the hammer to allow the hammer to perform a take back operation such that the hammer is projected toward the obstacle and is automatically returned to an inside of the punch main body.

The punch main body may include: an upper punch housing having a hammer discharge through hole configured to guide the obstacle contact portion and the hammer; and a lower punch housing coupled to the upper punch housing and having a pressure portion configured to pressurize the hammer so as to discharge a portion of the hammer to the outside.

The hammer may include: a conical portion formed in a conical shape such that one side thereof protrudes outward from the punch main body through the hammer discharge through hole; and a cylindrical portion formed in a cylindrical shape and connected to the conical portion.

The cylindrical portion may include: a first cylindrical portion having a cylindrical section of a surface area smaller than an area of a lower surface of the conical portion; and a second cylindrical portion having a cylindrical section of a sectional area smaller than a sectional area of the first cylindrical portion.

The upper punch housing may include: a hammer finger stop located adjacent to the conical portion and lock-supporting the lower surface of the conical portion.

the lower punch housing may include: an international global positioning system service (IGS) information transmitting and receiving module transmitting and receiving IGS information to and from an external IGS system provided at one side of the pressure portion; an IGS information transmitting and receiving module receptive portion receiving the IGS information transmitting and receiving module; and an IGS information transmitting and receiving module receptive portion cover covering IGS information transmitting and receiving module receptive portion to protect the IGS information transmitting and receiving module from an external impact.

The emergency escape kit may include: a belt cutter connected to the emergency escape punch and having a cutting blade to cut a belt such as a vehicle seat belt during an emergency event.

The belt cutter may include: a belt cutter main body having a cutting blade mounting portion to which the cutting blade is mounted; and a cutting blade support cover coupled to the belt cutter main body to support the cutting blade.

The belt cutter main body may include: a cutter main body base portion; a belt inserting portion formed by being recessed on one side of the cutter main body base portion so that the belt can be inserted toward the cutting blade; a first belt guide portion having an inclined surface formed adjacent to the belt inserting portion and being configured to guide a cut first belt, and the cutting blade support cover may include: a second belt guide portion provided to be opposed to the first belt guide portion with a flat surface of the cutter main body base portion as a center, and configured to guide a cut second belt.

The belt inserting portion may include: a first inserting slope formed by inclined at a first inserting angle that is a small angle among angles provided between a longitudinal edge at one side of the cutter main body base portion and an initial inserting direction of the belt, so that the initial inserting direction of the belt is determined that the initial inserting direction thereof intersect a longitudinal axis of the cutter main body base portion; and a second inserting slope connected to the first inserting slope, having a second inserting width formed larger than a first inserting width that is the minimum inserting width of the first inserting slope, and formed by being recessed to project the cutting blade outward.

The cutting blade may be mounted such that a cutting blade mounting angle, which is a small angle among angles formed between an extended line at a blade side edge of the cutting blade in a mounted state and the longitudinal edge at one side of the cutter main body base portion, is formed larger than the first inserting angle.

The cutter main body base portion may have a connection hole through which a connection portion connecting the emergency escape punch to the cutter main body base portion penetrates to be couplable, and the belt cutter main body may have a locking portion that is formed by being bent in a " ⊂ " shape at one side thereof and having an open end so that the locking portion may be lock-coupled to an external object.

Advantageous Effects

According to the present disclosure, the emergency escape kit is configured such that, the emergency escape punch shatters an obstacle such as a glass window in a vehicle and a building for helping a user escape when an emergency event such as fire and the gas mask filtering a poisonous gas to minimize an injury due to the poisonous gas are efficiently coupled to each other with a simple and compact structure. Accordingly, the portability of the emergency escape kit can be improved.

MODE FOR INVENTION

Figure 1:
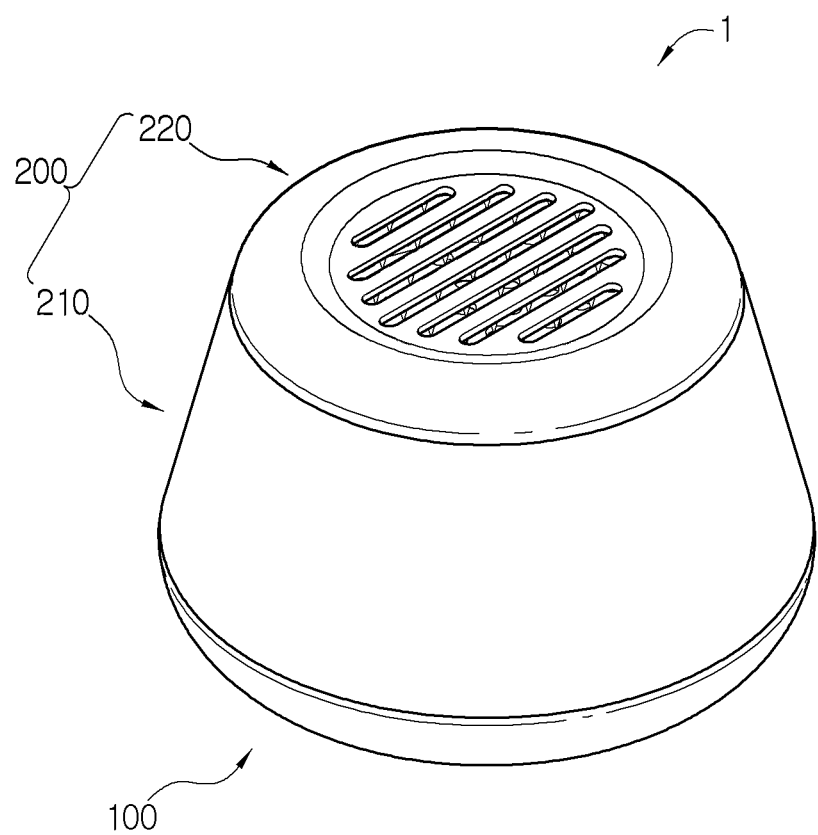
FIG. 1 is a perspective view showing an emergency escape kit according to an embodiment of the present disclosure.

Hereinbelow, to aid to understanding the present disclosure, operational advantages of the present disclosure, and purpose achieved by implementing the present disclosure, exemplary embodiments of the present disclosure will be described with reference to accompanying drawings and contents disclosed in the drawings.

In the following description, the structural or functional description specified to exemplary embodiments according to the concept of the present disclosure is intended to describe the exemplary embodiments, so it should be understood that the present disclosure may be variously embodied, without being limited to the exemplary embodiments.

The exemplary embodiments according to the concept of the present disclosure may be variously modified and may have various shapes, so examples of which are illustrated in the accompanying drawings and will be described in detail with reference to the accompanying drawings. However, it should be understood that the exemplary embodiments according to the concept of the present disclosure are not limited to the embodiments which will be described hereinbelow with reference to the accompanying drawings, but various modifications, equivalents, additions, and substitutions are possible, without departing from the scope and spirit of the invention.

It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Further, the terms used herein to describe a relationship between elements, for example, "between", "directly between", "adjacent", or "directly adjacent" should be interpreted in the same manner as those described above.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present disclosure will be described in detail with reference to accompanying drawings. The same reference numerals will be used throughout the drawings to refer to the same or like elements or parts.

Figure 2:
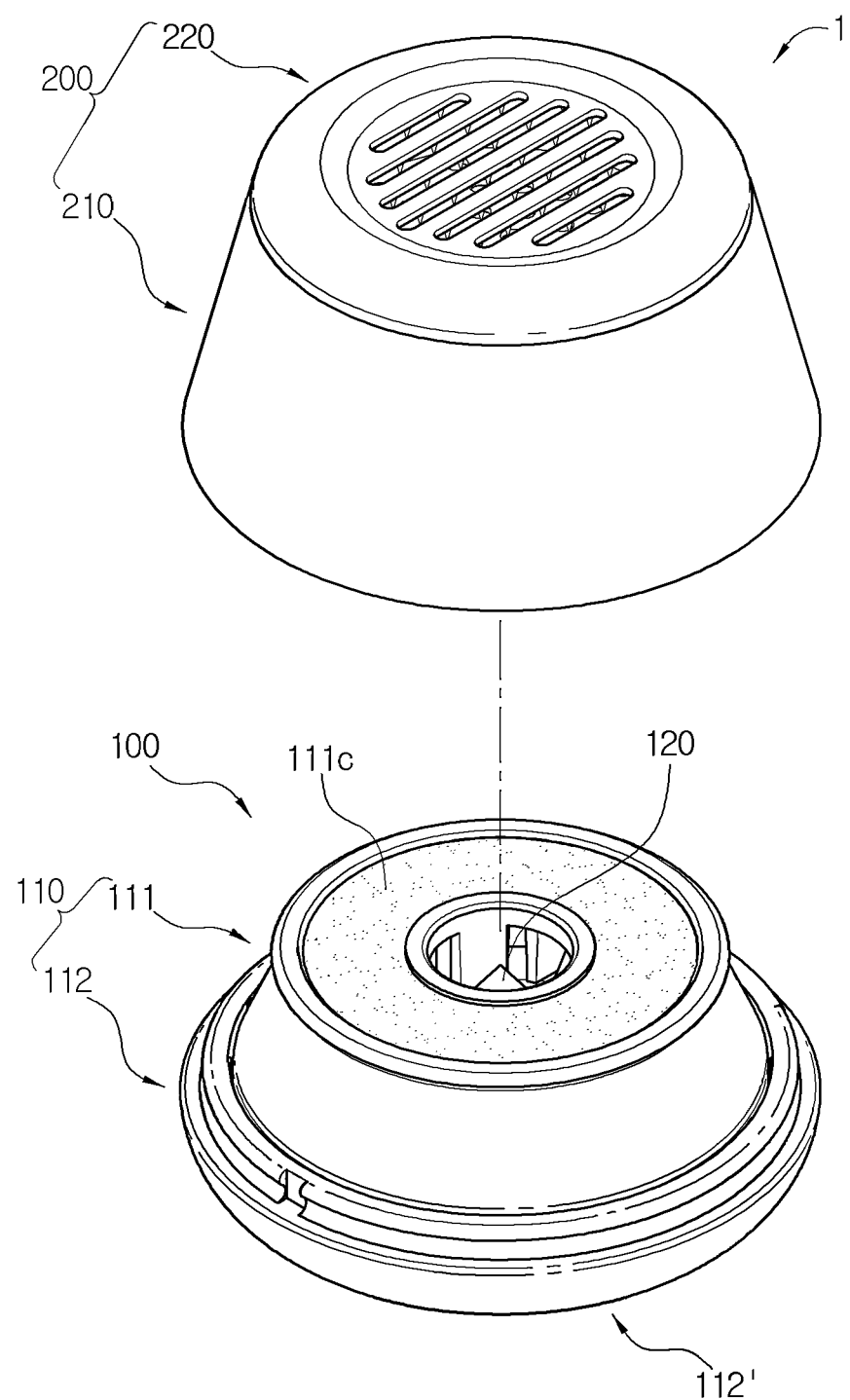
FIG. 2 is an exploded-perspective view showing the emergency escape kit in FIG. 1.
Figure 3:
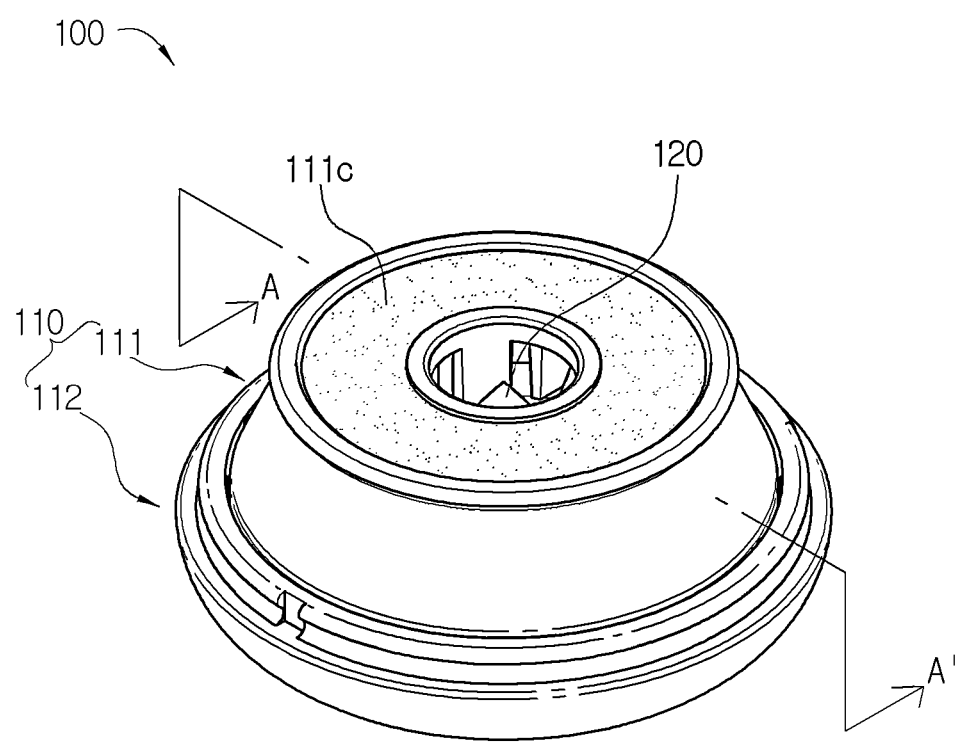
FIG. 3 is a perspective view showing an emergency escape punch in a state in which the emergency escape punch is separated from the emergency escape kit in FIG. 1.
Figure 4:
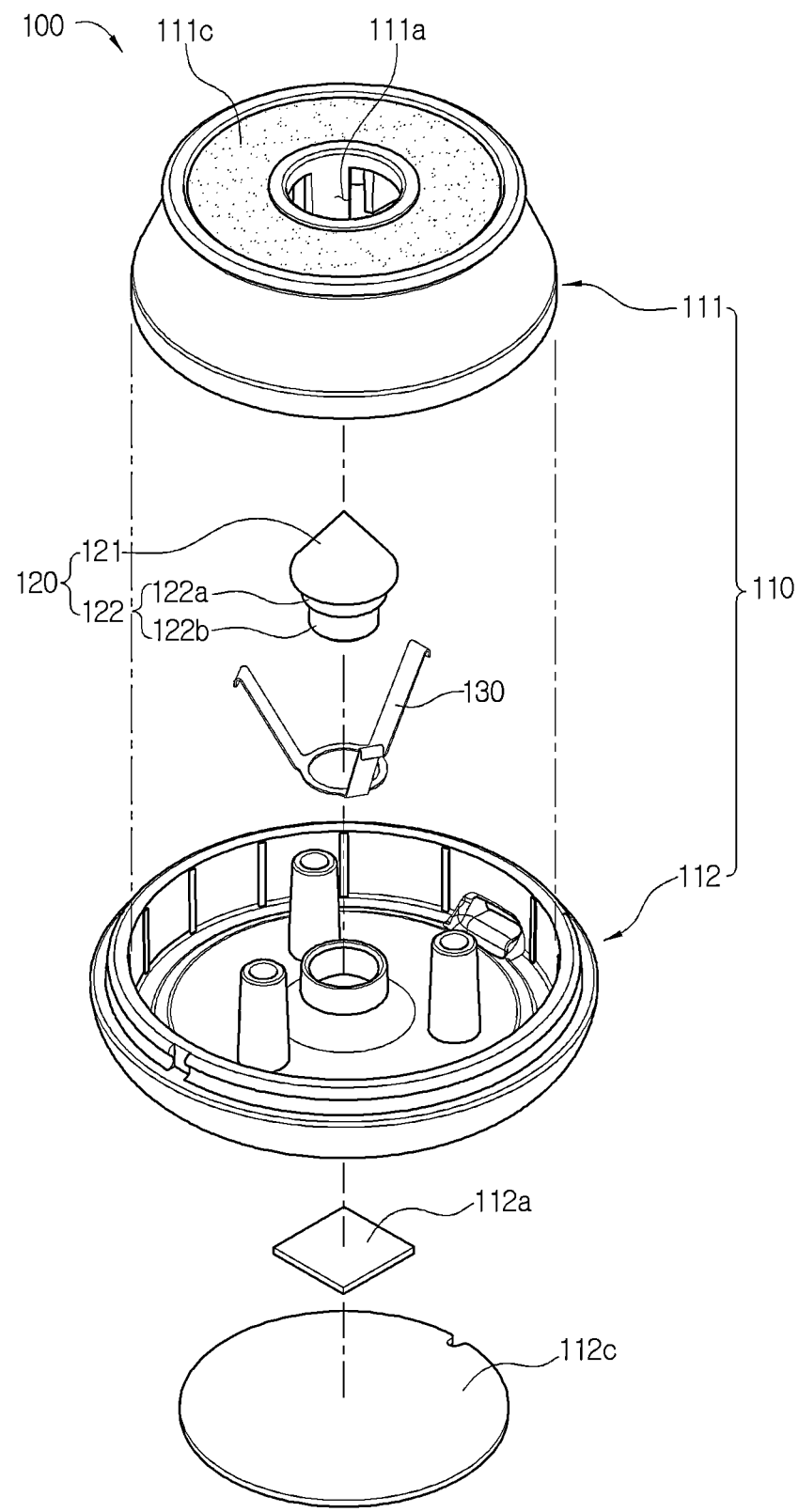
FIG. 4 is an exploded-perspective view showing the emergency escape punch of FIG. 3.
Figure 5:
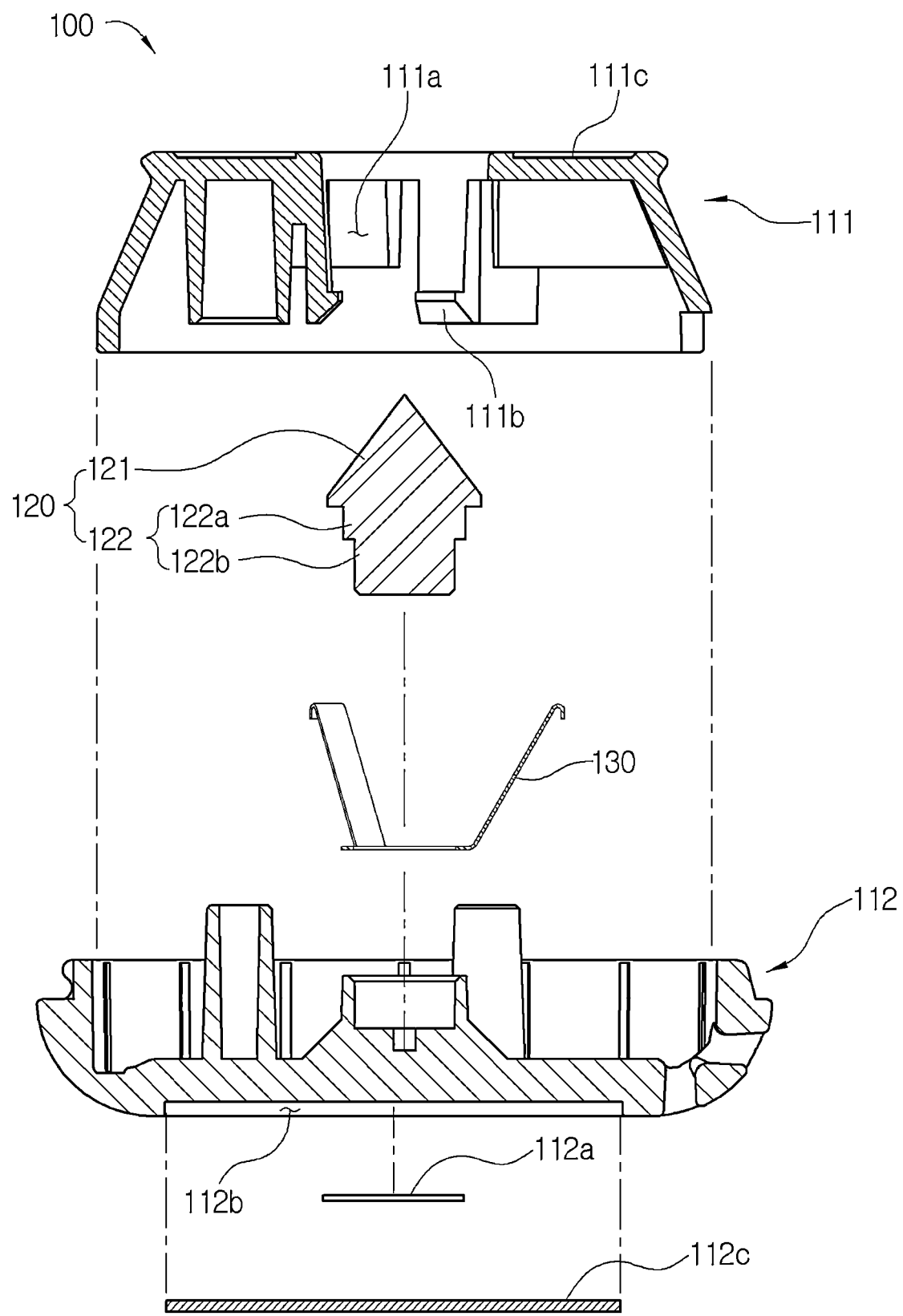
FIG. 5 is a sectional view showing the emergency escape punch in FIG. 3.

FIG. 1 is a perspective view showing an emergency escape kit according to an embodiment of the present disclosure. FIG. 2 is an exploded-perspective view showing the emergency escape kit in FIG. 1. FIG. 3 is a perspective view showing an emergency escape punch in a state in which the emergency escape punch is separated from the emergency escape kit in FIG. 1. FIG. 4 is an exploded-perspective view showing the emergency escape punch of FIG. 3. FIG. 5 is a sectional view showing the emergency escape punch in FIG. 3.

As shown in FIGS. 1 to 5, the emergency escape kit 1 according to the embodiment includes the emergency escape punch 100 and a gas mask 200.

The emergency escape kit 1 according to the embodiment has improved portability with the emergency escape punch 100 and the gas mask 200 that are efficiently coupled to each other by a simple and compact structure.

First, the emergency escape punch 100 is configured as follows.

The emergency escape punch 100 includes an obstacle contact portion 111c that may be brought into close contact with an obstacle such as a glass window when an emergency event such as fire occurs and a pressure portion 112' that may be pressurized. The obstacle contact portion 111c according to the embodiment is made of a sticky adhesive material. Therefore, when an emergency event occurs, the obstacle contact portion 111c adheres to the obstacle and the pressure portion 112' is pressurized to shatter the obstacle G.

The emergency escape punch 100 is configured such that, the pressure portion 112' provided at a side opposite to the obstacle contact portion 111c located between the pressure portion 112' and the obstacle is pressurized from the outside to easily shatter the obstacle. The emergency escape punch 100 includes a punch main body 110, a hammer 120, and a hammer support elastic body 130.

The punch main body 110 includes an upper punch housing 111 and a lower punch housing 112.

The upper punch housing 111 includes the obstacle contact portion 111c described above and a hammer discharge through hole 111a that is a through hole guiding the hammer 120. The hammer discharge through hole 111a guides the hammer 120 when the pressure portion 112' is pressurized from the outside, so that a portion of the hammer 120 is projected toward a side opposite to the pressure portion 112'.

When a user pressurizes the pressure portion 112' during an emergency event, the hammer discharge through hole 111a guides a portion of the hammer 120 to be projected, so that the obstacle at the outside may be shattered. A projected length of the hammer 120 may be limited to a preset safety length.

As described above, as the projected length of the hammer 120 is limited to the preset safety length, it is possible to prevent the hammer 120 from being excessively projected to injure the user.

The upper punch housing 111 includes a hammer finger stop 111*b* located adjacent to a conical portion 121 of the hammer 120 and lock-supporting a lower surface of the conical portion 121. As described above, the hammer finger stop 111*b* may lock-support the conical portion 121 of the hammer 120 to stably support the hammer 120. The hammer finger stop 111*b* may react immediately when the pressure portion 112' is pressurized so that the obstacle may be rapidly shattered.

The lower punch housing 112 has the pressure portion 112' coupled to the upper punch housing 111 and pressurized so that a portion of the hammer 120 is projected outward. The lower punch housing 112 includes an international global positioning system service (IGS) information transmitting and receiving module 112*a*, an IGS information transmitting and receiving module receptive portion 112*b*, and an IGS information transmitting and receiving module receptive portion cover 112*c* covering the IGS information transmitting and receiving module receptive portion 112*b* to protect the IGS information transmitting and receiving module 112*a* from an external impact.

The IGS information transmitting and receiving module 112*a* transmits and receives IGS information through an external IGS satellite (not shown). The IGS satellite (not shown) refers to GPS. The IGS information transmitting and receiving module 112*a* receives a signal transmitted from the IGS satellite and transmits location information of the user to the IGS satellite to determine a location of the IGS information transmitting and receiving module 112*a*. A distance between the IGS satellite and the IGS information transmitting and receiving module 112*a* may be calculated by measuring a time difference between the signal transmitted from the IGS satellite and the signal transmitted from the IGS information transmitting and receiving module 112*a*. The location of IGS information transmitting and receiving module 112*a* may be calculated by trilateration using distances between at least three IGS satellites and the IGS information transmitting and receiving module 112*a* and a location of each of the IGS satellites. Accordingly, a location of the user using the emergency escape kit 1 may be calculated, and the user transmits a user's location signal and a signal for help during an emergency event to facilitate rescue of the user in an emergency situation.

The IGS information transmitting and receiving module receptive portion 112*b* is a portion receiving the IGS information transmitting and receiving module 112*a* therein and formed in a compact shape in a portion of the lower punch housing 112. The IGS information transmitting and receiving module receptive portion 112*b* is provided to prevent the IGS information transmitting and receiving module 112*a* from degrade the portability of the emergency escape kit 1 and may efficiently transmit and receive a location signal and a signal for help of the user.

Meanwhile, the hammer 120 is provided inside the punch main body 110 and is partially projected toward the obstacle when the user pressurizes a side thereof opposite to the obstacle so that the obstacle may be shattered. According to the embodiment, the hammer 120 includes the conical portion 121 and a cylindrical portion 122. However, a right scope of the present disclosure is not limited thereto and may have various shapes when needed.

The conical portion 121 has a conical shape so that one side thereof may be projected to the outside of the punch main body through the hammer discharge through hole 111*a*, and the conical portion 121 is a portion capable of shattering the obstacle during an emergency event. As described above, the hammer 120 has the conical portion 121 at a side thereof shattering the obstacle, so that a peak portion transmitting an outside pressure force to the obstacle may concentrate without distributing the outside pressure force. Therefore, the obstacle may be efficiently shattered even with a low-pressure force.

The cylindrical portion 122 has a cylindrical shape and is connected to the conical portion 121. The cylindrical portion 122 includes a first cylindrical portion 122*a* having a cylindrical section of a surface area smaller than an area of a lower surface of the conical portion and a second cylindrical portion 122*b* having a cylindrical section of a sectional area smaller than a sectional area of the first cylindrical portion. As described above, the cylindrical portion 122 has a plurality of cylindrical portions with different sectional areas, and is formed in a multi-stepped shape. The multi-stepped cylindrical portion 122 is coupled to the hammer support elastic body 130 to allow the hammer 120 to automatically perform a take back operation and to simultaneously prevent the hammer 120 from accidentally deviating from its location.

As described above, the hammer support elastic body 130 is coupled to the multi-stepped hammer 120, supports the hammer 120 to enable the take back operation in which the hammer 120 is projected toward the obstacle and is returned to the inside of the punch main body 110, and prevents accidental deviation of the hammer 120.

As described above, the hammer support elastic body 130 according to the embodiment may pressurize the pressure portion 112' to discharge a portion of the hammer 120 to shatter the obstacle, and then allow the hammer 120 to perform the take back operation without a separate operation. Therefore, it is possible to prevent the user from being injured by the hammer 120 as the hammer 120 remains in a projected state.

In addition, even when the obstacle is not shattered in one pressure as the pressure portion 112' is primarily pressurized, the pressure portion 112' is re-pressurized to discharge the hammer 120 that has automatically taken back to the obstacle, so that the obstacle may be efficiently shattered.

Figure 6:
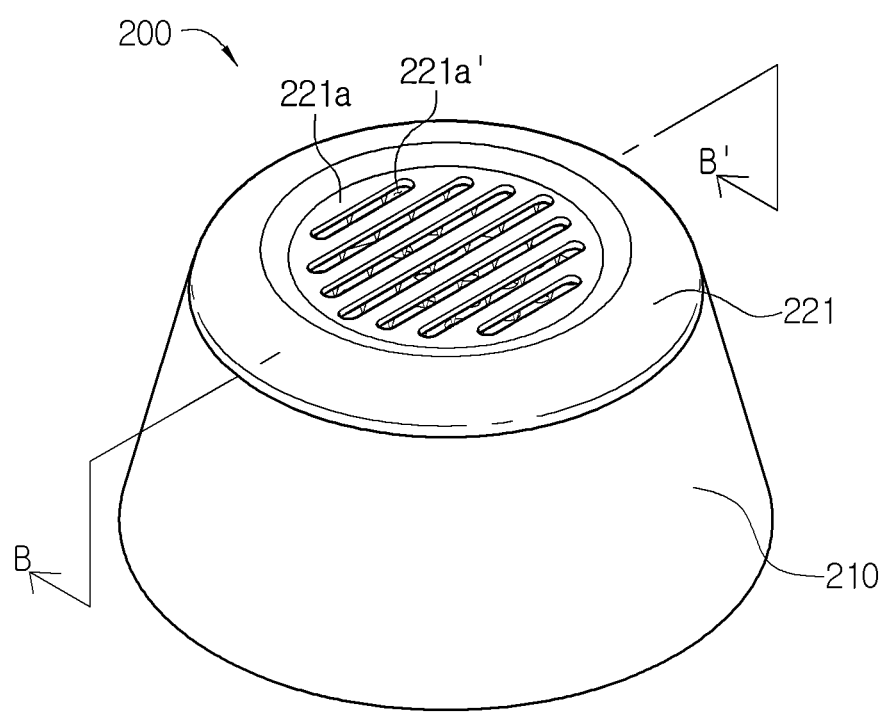
FIG. 6 is a perspective view showing a gas mask in a state in which the gas mask is separated from the emergency escape kit in FIG. 1.
Figure 7:
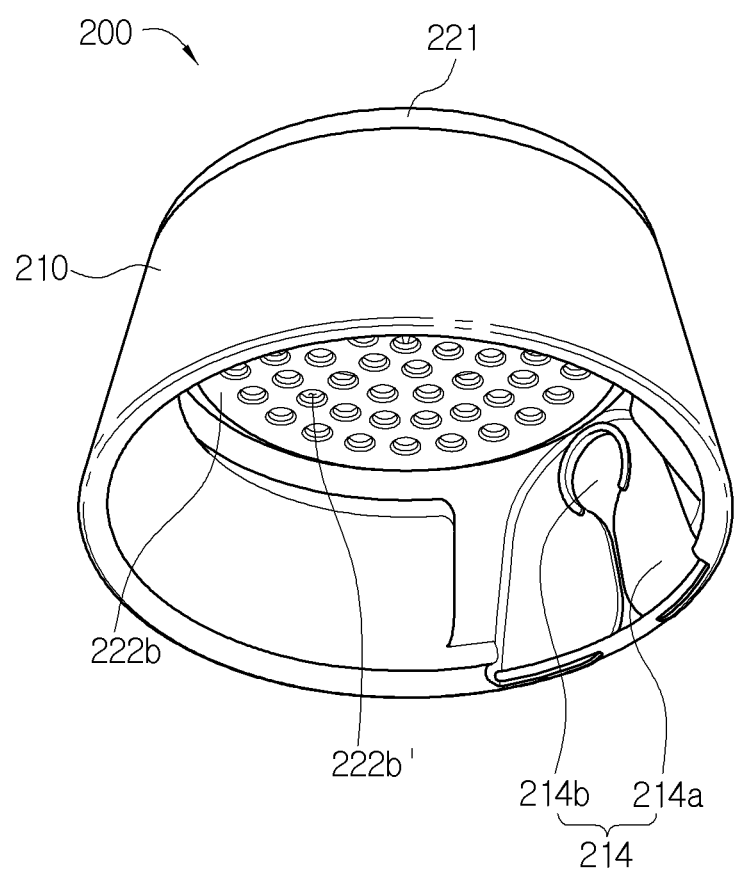
FIG. 7 is a side perspective view showing the gas mask in FIG. 6.
Figure 8:
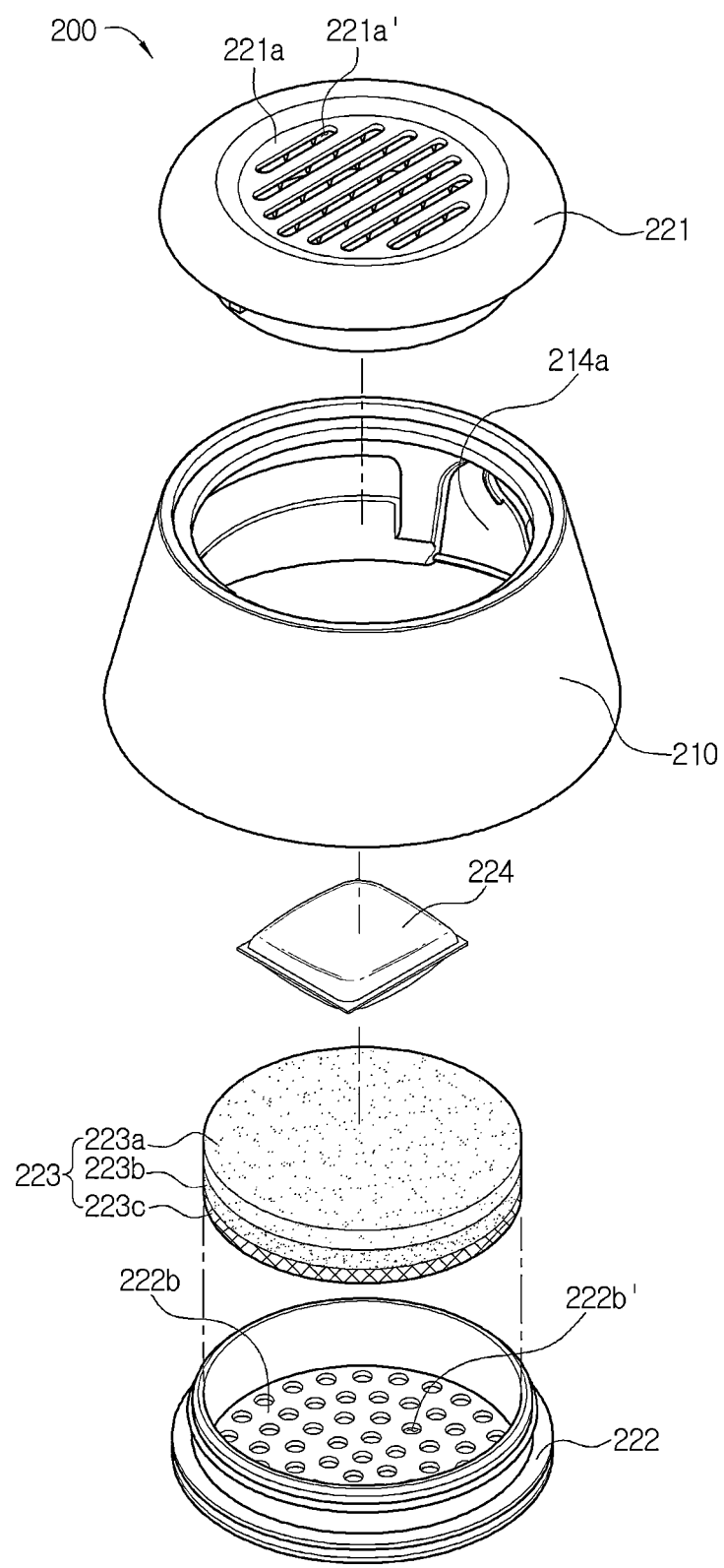
FIG. 8 is an exploded-perspective view showing the gas mask in FIG. 6.
Figure 9:
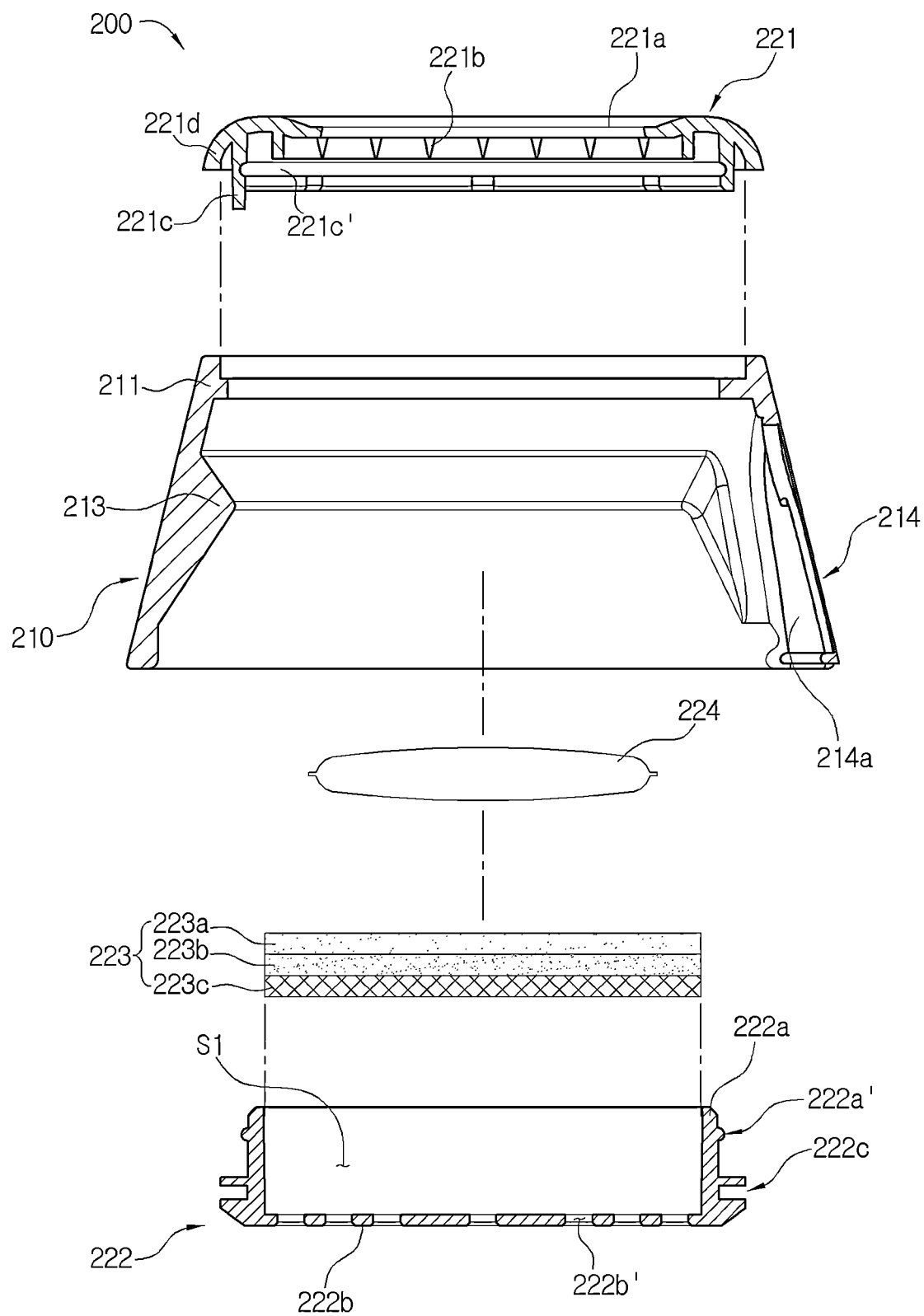
FIG. 9 is an exploded-sectional view showing the gas mask in FIG. 6.

FIG. 6 is a perspective view showing the gas mask in a state in which the gas mask is separated from the emergency escape kit in FIG. 1. FIG. 7 is a side perspective view showing the gas mask in FIG. 6. FIG. 8 is an exploded-perspective view showing the gas mask in FIG. 6. FIG. 9 is an exploded-sectional view showing the gas mask in FIG. 6.

As shown in FIGS. 6 to 9, the gas mask 200 is provided to be couplable to and separable from the emergency escape punch 100.

When the gas mask 200 according to the embodiment is coupled to the emergency escape punch 100, a portion of the emergency escape punch 100 may be shielded from the outside. Therefore, the gas mask 200 prevents the user from being injured or other objects from being damaged due to accidental deviation of the emergency escape punch 100.

When the gas mask 200 is separated from the emergency escape punch 100 and is brought in to close contact with the respiratory organ of the user, the gas mask 200 may block an inflow of poisonous gas from the outside into the respiratory organ of the user to prevent the user from being injured due to the poisonous gas. The gas mask 200 includes a gas mask main body 210 and a poisonous gas filtering module 220.

The gas mask main body 210 has an emergency escape punch receiving space S therein to receive a portion of the emergency escape punch 100. Therefore, when the gas mask main body 210 is coupled to the emergency escape punch 100, a portion of the emergency escape punch 100 may be received in the emergency escape punch receiving space S.

As described above, the portability of the emergency escape kit is improved as the emergency escape punch 100 is received in the gas mask main body 210. Furthermore, there is an advantage of preventing an injury to the user when the emergency escape punch 100 accidentally deviates.

The emergency escape punch receiving space S may receive the respiratory organ of the user when being separated from the emergency escape punch 100 and being brought into close contact with the respiratory organ of the user. In order to allow the gas mask 200 to be in efficiently close contact with the face of the user when the respiratory organ of the user is received in the emergency escape punch receiving space S, the gas mask main body 210 is made of an elastic material.

The gas mask main body 210 includes a main body portion 210' having a truncated conical shape and a flexible portion 214 formed in a portion inside the main body portion 210' in a stepped shape and stretched to fit the size of a part for use of the user.

The flexible portion 214 includes a first flexible surface 214a connected to the main body portion 210' and having a thickness thinner than a thickness of the main body portion 210' and a second flexible surface 214b connected to the first flexible surface 214a in a streamlined shape and having a thickness thinner than the thickness of the first flexible surface 214a. In addition, the gas mask main body 210 of the embodiment includes a first protrusion 211, a second protrusion 212, and a third protrusion 213.

The first protrusion 211 is formed by protruding toward the poisonous gas filtering module 220 and is lock-coupled to the poisonous gas filtering module 220. The second protrusion 212 is formed by protruding from an end of the gas mask main body 210 at the emergency escape punch 100 toward the center inside the emergency escape punch receiving space S and is lock-coupled to the emergency escape punch 100. The third protrusion 213 is formed by protruding from a portion between the first protrusion 211 and the second protrusion 212 toward the center inside the emergency escape punch receiving space S to increase a coupling force of the gas mask main body 210.

The poisonous gas filtering module 220 is removably coupled to the gas mask main body 210 and filters a poisonous gas. The poisonous gas filtering module 220 includes an upper filter housing 221, a lower filter housing 222, and a water-soluble substance receiving bag 224. The poisonous gas filtering module 220 is removably coupled to the gas mask main body 210, so that only the poisonous gas filtering module 220 may be replaced with a new poisonous gas filtering module for next use, even after the gas mask 200 is used during an emergency event and the poisonous gas filtering module 220 is contaminated with a poisonous gas.

The upper filter housing 221 includes a contact frame 221d connected to the gas mask main body 210 and blocking inflow of an external fluid, and includes an external air flow frame 221a, a protruding pin 221b, an upper coupling frame 221c, and the contact frame 221d.

The external air flow frame 221a is provided adjacent to an outside plate surface of a poisonous gas filter 223, and formed by perforating the upper filter housing 221. Accordingly, external air flows into the inside of upper filter housing 221 while passing through the poisonous gas filter 223 or internal air flows to the outside thereof while passing through the poisonous gas filter.

The protruding pin 221b is formed by protruding from the external air flow frame 221a toward the lower filter housing 222 while being spaced apart from the water-soluble substance receiving bag 224. As described above, the protruding pin 221b is arranged to be spaced apart from the water-soluble substance receiving bag 224, so that water-soluble substance does not leak in normal time. However, when an emergency event occurs, the external air flow frame 221a is pressurized to efficiently cut the water-soluble substance receiving bag 224. The water-soluble substance may be at least one selected from water, ethylalcohol, 3-Methoxy-3-Methyl-1-Butanol (MMB), propylene carbonate, dimethyl sulfoxide, acetic acid, etc.

When a poisonous gas leaks, the protruding pin 221b cuts the water-soluble substance receiving bag 224 by pressurizing the external air flow frame 221a. Then, at least one water-soluble substance selected from water, ethylalcohol, MMB, propylene carbonate, dimethyl sulfoxide, and acetic acid is absorbed into the poisonous gas filter 223, so that a poisonous gas may be efficiently filtered by the poisonous gas filter 223.

The upper coupling frame 221c is connected to both the contact frame 221d and the external air flow frame 221a, and has a recessed locking portion formed by being recessed to be lock-coupled to the lower filter housing 222.

The contact frame 221d is in contact with the gas mask main body 210 to prevent an external poisonous gas from flowing into the inside of the gas mask.

The lower filter housing 222 has a poisonous gas filter receiving space Si receiving the poisonous gas filter 223 filtering a poisonous gas. The lower filter housing 222 is coupled to the upper filter housing 221 and includes a lower coupling frame 222a, an internal air flow frame 222b, and a main body coupling portion 222c.

The lower coupling frame 222a has a protruding lock area 222a' formed by protruding toward the recessed locking portion 221c' and lock-coupled to the recessed locking portion. The lower coupling frame 222a has the poisonous gas filter receiving space Si therein.

The internal air flow frame 222b is connected to the lower coupling frame 222a in a direction that intersects a longitudinal direction of the lower coupling frame 222a. The internal air flow frame 222b has an internal air flow portion 222b' for ventilation of the internal air.

The main body coupling portion 222c is formed by protruding outward in a multi-stepped shape from the lower coupling frame 222a and is coupled to the gas mask main body 210.

The water-soluble substance receiving bag 224 is arranged between the poisonous gas filter 223 and the upper filter housing 221 and receives the water-soluble substance 1. The poisonous gas filter 223 may include a first poisonous gas filter 223a, a second poisonous gas filter 223b, and a third poisonous gas filter 223b.

The first poisonous gas filter 223a, the second poisonous gas filter 223b, and the third poisonous gas filter 223b may be different filters with different substances from each other. The poisonous gas filter 223 consists of a plurality of layers, so the poisonous gas filter 223 may perform filtering in response to components of various poisonous gases. However, the right scope of the present disclosure is not limited thereto, and the poisonous gas filter may be a filter including at least four layers as needed.

Figure 10:
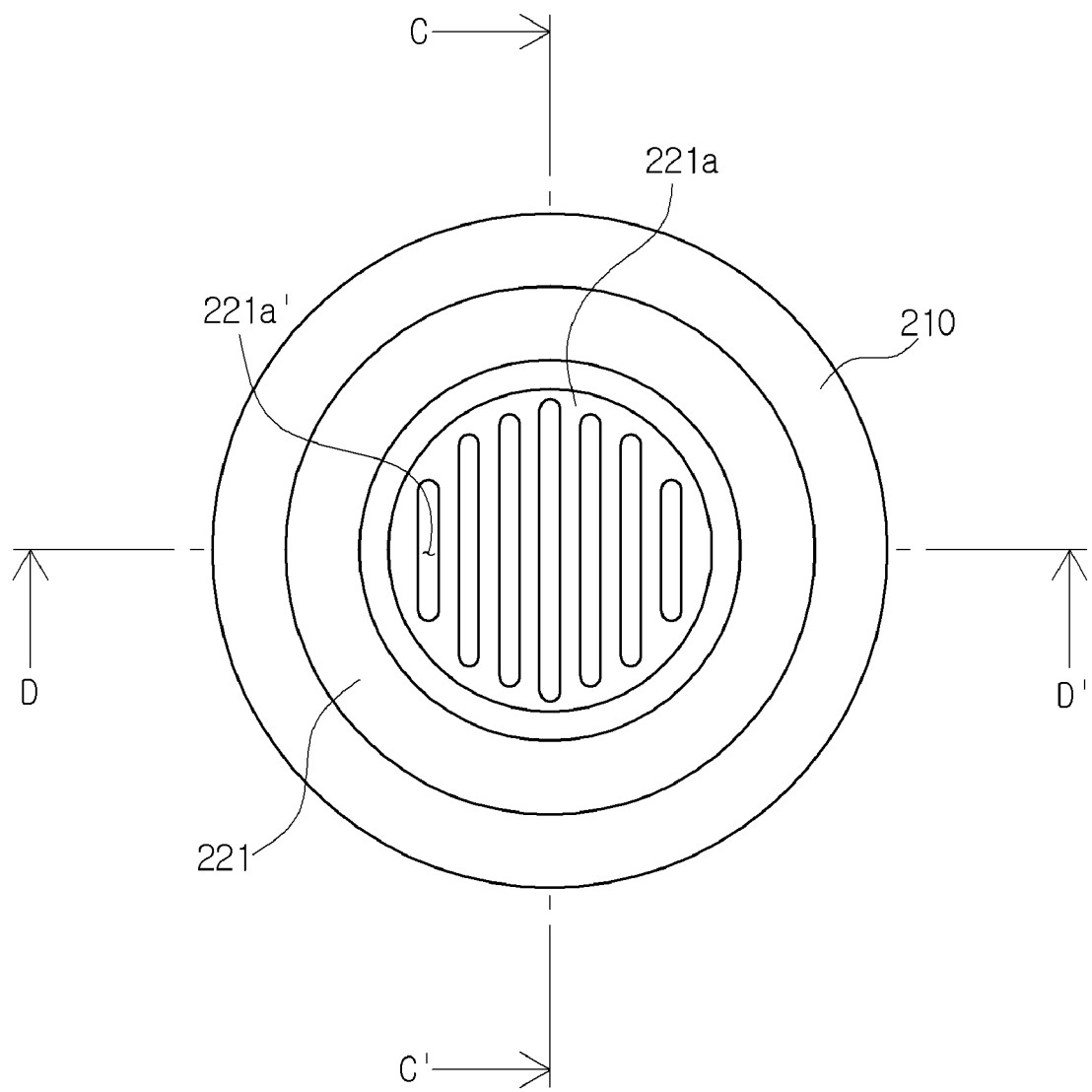
FIG. 10 is a plan view showing the emergency escape kit in FIG. 1.
Figure 11A:
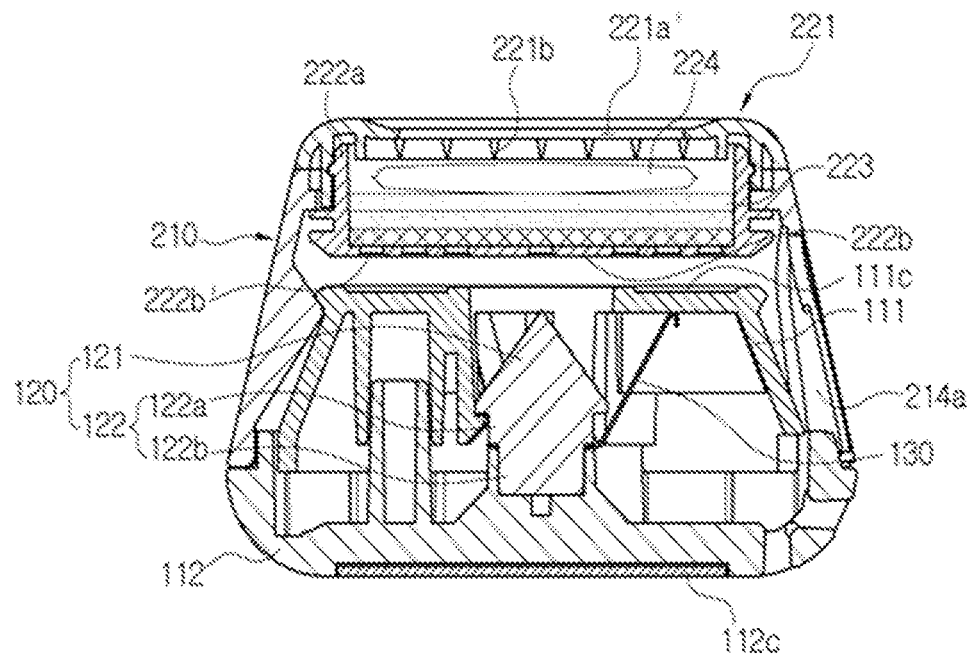
FIG. 11A is a sectional view showing a cut portion of the emergency escape kit cut along line B-B' in FIG. 10.
Figure 11B:
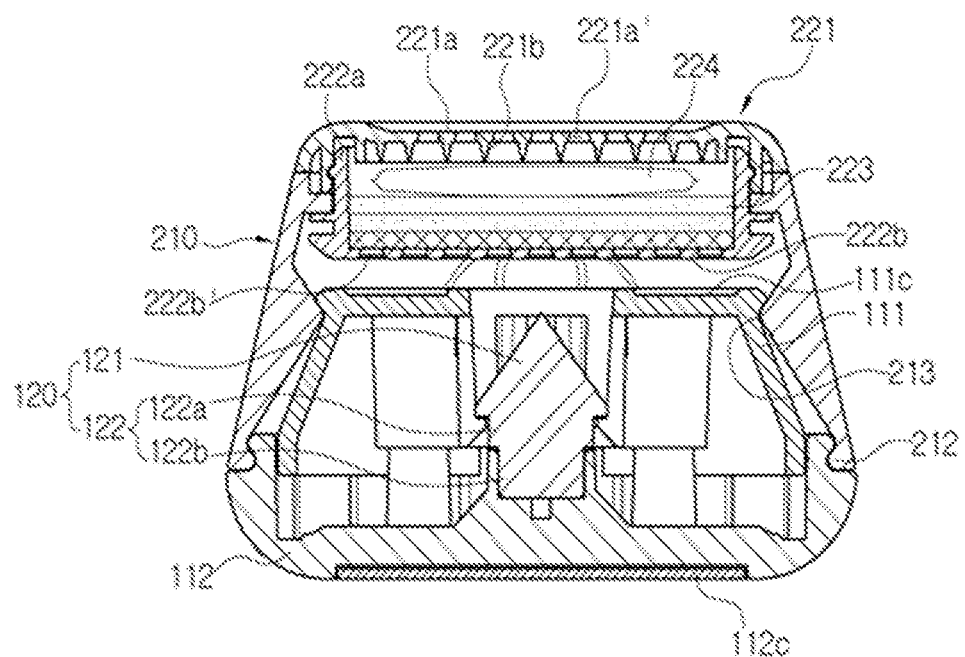
FIG. 11B is a sectional view showing a cut portion of the emergency escape kit cut along line C-C' in FIG. 10.

FIG. 10 is a plan view showing the emergency escape kit in FIG. 1. FIG. 11A is a sectional view showing a cut portion of the emergency escape kit cut along line B-B' in FIG. 10. FIG. 11B is a sectional view showing a cut portion of the emergency escape kit cut along line C-C' in FIG. 10.

As shown in FIGS. 10, 11A, and 11B, the emergency escape punch 100 and the gas mask 200 are efficiently coupled to each other to improve the portability of the emergency escape kit.

Hereinbelow, the coupling structure of the emergency escape punch 100 and the gas mask 200 will be described in detail.

As described above, the emergency escape punch 100 is received in the emergency escape punch receiving space S provided in the gas mask main body 210 so that the user can carry the emergency escape punch 100 and the gas mask 200 simultaneously. During an emergency event, the emergency escape punch 100 is separated from the gas mask main body 210. The separated emergency escape punch 100 may be brought into close contact with the obstacle to shatter the obstacle, and the gas mask 200 may be brought into close contact, at the gas mask main body 210, with the respiratory organ of the user to prevent the user from breathing the poisonous gas.

The lower punch housing 112 may be lock-coupled to the second protrusion 212 of the gas mask main body 210, whereby the user can easily carry the emergency escape punch 100 and the gas mask 200 that has been coupled to each other.

The third protrusion 213 supports the upper punch housing 111 to improve the stability of the emergency escape kit. The first protrusion 211 is separably coupled to the poisonous gas filtering module 220. Therefore, the poisonous gas filtering module 220 is reusable and the usability of the emergency escape kit may be improved as described above.

Figure 12:
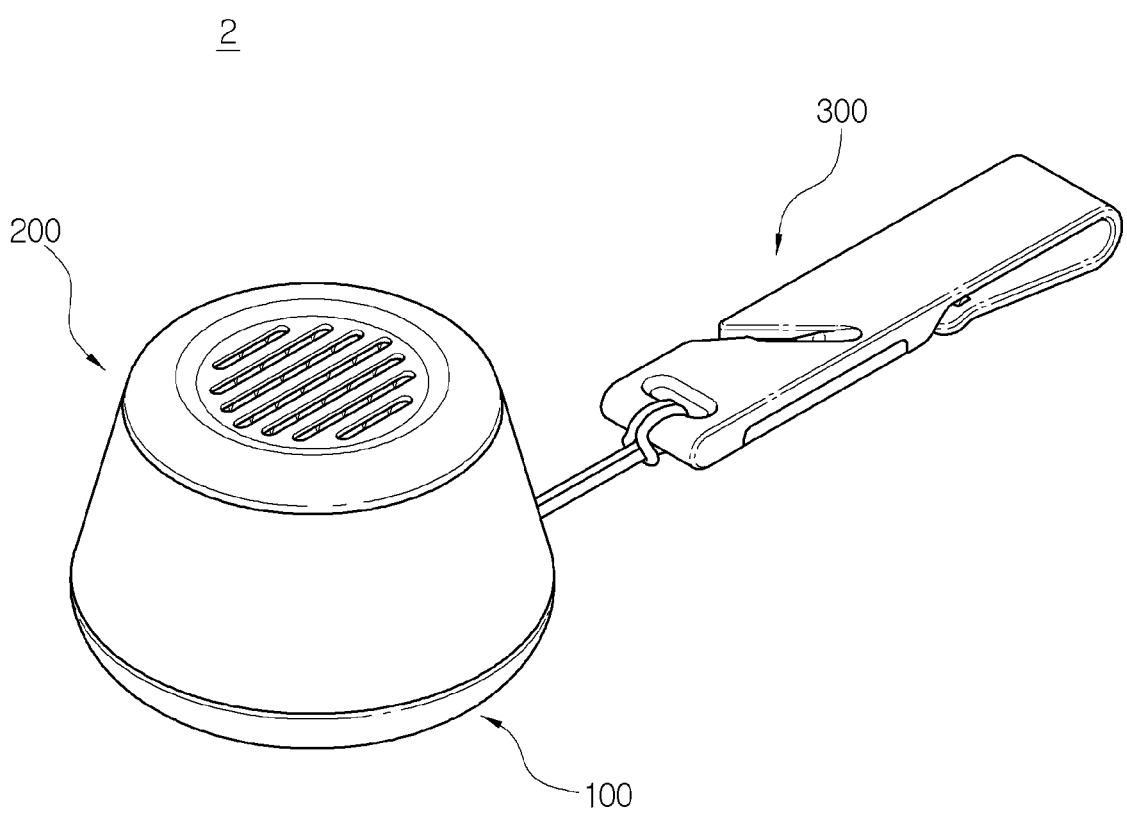
FIG. 12 is a perspective view showing an emergency escape kit according to a second embodiment of the present disclosure.
Figure 13:
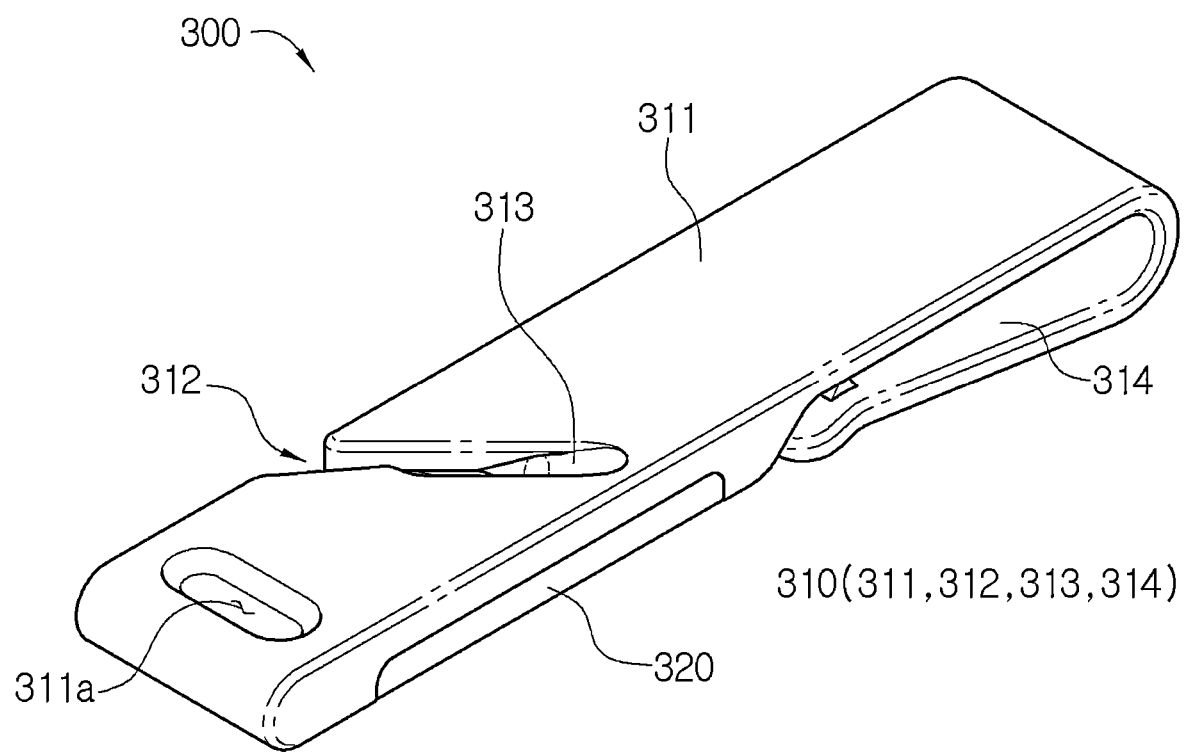
FIG. 13 is a perspective view showing a belt cutter in a state in which the belt cutter is separated from the emergency escape kit in FIG. 12.
Figure 14:
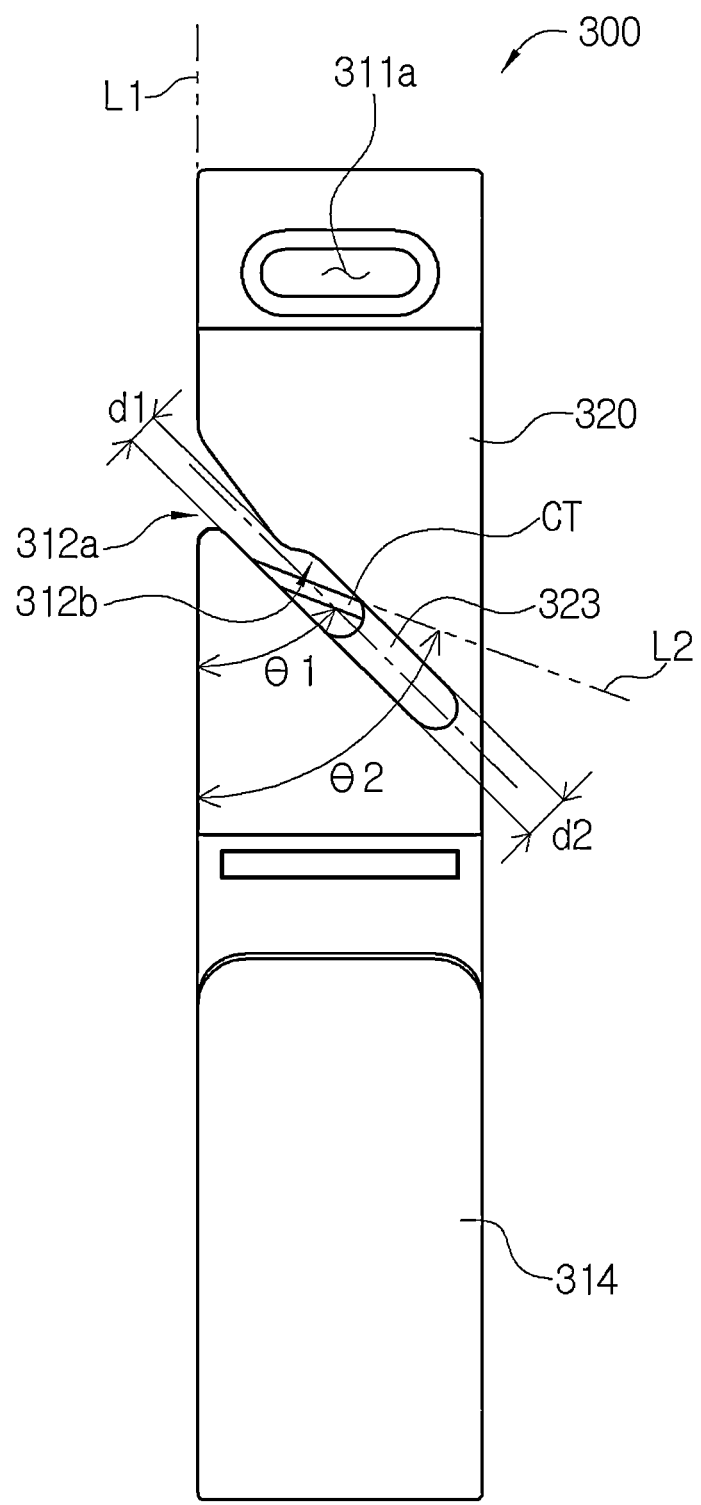
FIG. 14 is a plan view showing the belt cutter in FIG. 13.
Figure 15:
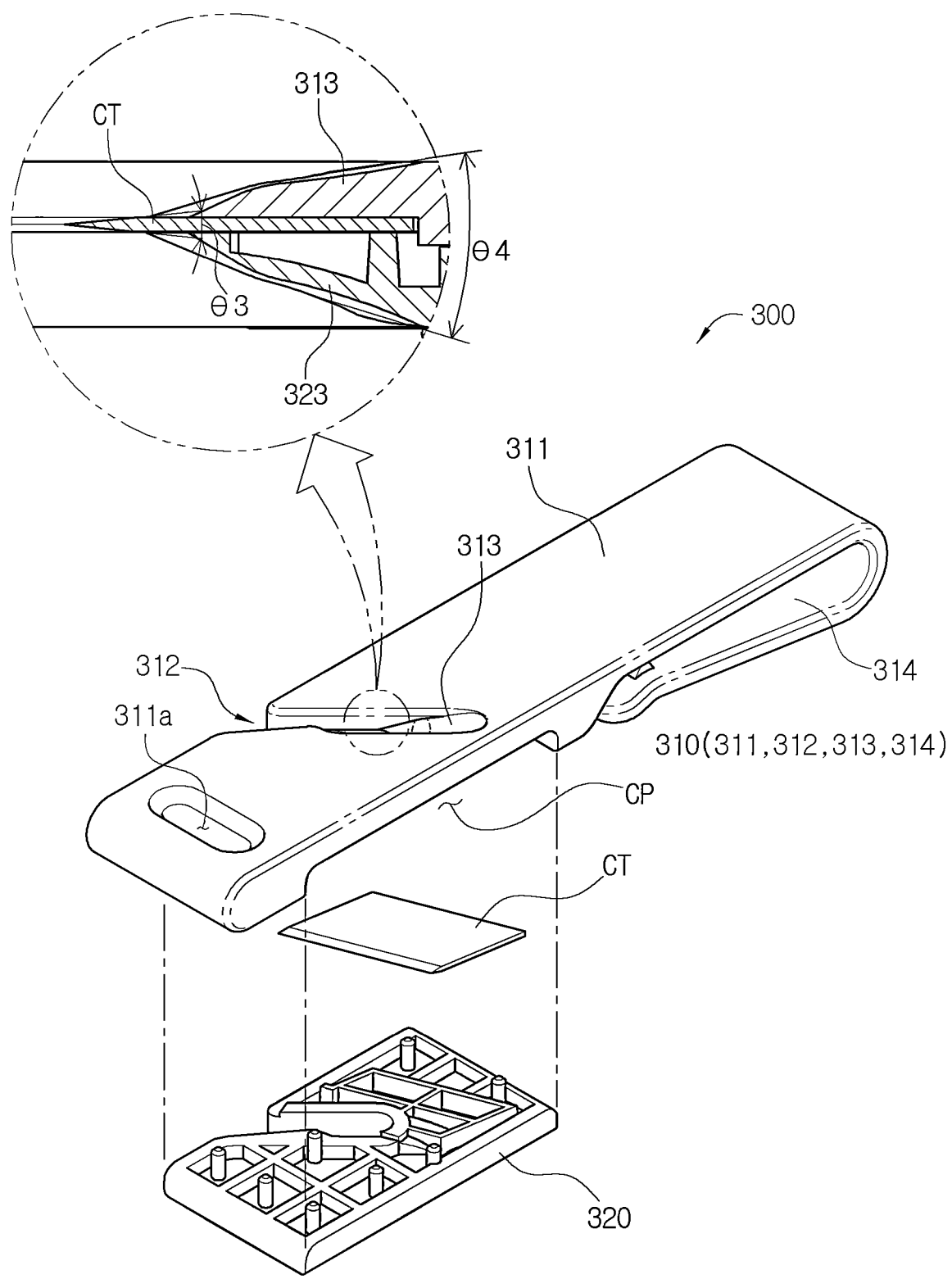
FIG. 15 is an exploded-perspective view showing the belt cutter in FIG. 13.

FIG. 12 is a perspective view showing an emergency escape kit according to a second embodiment of the present disclosure. FIG. 13 is a perspective view showing a belt cutter in a state in which the belt cutter is separated from the emergency escape kit in FIG. 12. FIG. 14 is a plan view showing the belt cutter in FIG. 13. FIG. 15 is an exploded-perspective view showing the belt cutter in FIG. 13.

The emergency escape kit 2 according to the second embodiment has difference of including a belt cutter 300 from the previous embodiment.

Hereinbelow, elements that are different from the previous embodiment of the present disclosure will be described with reference to FIGS. 12 to 15, and descriptions of the same elements as the previous embodiment will be omitted.

As shown in detail in FIGS. 12 to 15, the belt cutter 300 includes: a belt cutter main body 310 a cutting blade mounting portion CP to which a cutting blade C may be mounted so that a belt B with high rigidity such as a vehicle seat belt may be cut by the cutting blade C in an emergency event; and a cutting blade support cover 320 coupled to the belt cutter main body 310 to support the cutting blade C.

The belt cutter main body 310 includes a cutter main body base portion 311, a belt inserting portion 312, a first belt guide portion 313, and a locking portion 314.

The cutter main body base portion 311 provides the cutting blade mounting portion CP to stably support the cutting blade.

The belt inserting portion 312 is formed by being recessed at one side of the cutter main body base portion 311, so that the belt B may be inserted into the belt inserting portion 312 toward the cutting blade C. The belt inserting portion 312 according to the second embodiment is formed by being recessed at one longitudinal edge of the cutter main body base portion 311, and includes a first inserting slope 312a and a second inserting slope 312b.

The first inserting slope 312a is formed to be inclined at a first inserting angle θ1 in order to determine an initial inserting direction of the belt B to be intersected with a longitudinal axis L1 of the cutter main body base portion 311. The first inserting angle θ1 is a small angle among angles provided between the longitudinal edge of the cutter main body base portion 311 and the initial inserting direction of the belt B. Accordingly, the user can insert the belt B that causes a malfunction thereof during a vehicle accident into the belt cutter.

The second inserting slope 312b is connected to the first inserting slope 312a, has a second inserting width d2 larger than a first inserting width d1 that is the minimum inserting width of the first inserting slope 312a, and is formed by being recessed so that the cutting blade C protrudes outward. Accordingly, as a space receiving the belt B inserted through the first inserting slope 312a is widened, even when the belt B overlaps due to an external force transmitted to the belt, the overlapping belt B may be received in the belt inserting portion 312, and the belt B may be easily cut by the inclined cutting blade C.

In order to cut the belt B, the belt B is moved from the first inserting passage 312a to the second inserting passage 312b. The first inserting passage 312a is formed such that the width thereof is gradually reduced from the initial insertion width. In other words, initial insertion of the belt B may be easily performed as the insertion width at the initial insertion is large, and the belt B is aligned to be easily cut as the insertion width is gradually reduced.

The first inserting width d1 that is the minimum width of the width of the first inserting passage 312a is formed narrower than the second inserting width d2 of the second inserting passage 312b, so that the structure efficiently aligns the belt B. The aligned belt B may be easily cut by the cutting blade C protruding from the second inserting passage 312b. In addition, the second inserting width d2 of the second inserting passage 312b is formed wider than the first inserting width d1 to provide a space where the belt B may be received even when the belt B is rapidly inserted and overlaps.

With the cutting blade C according to the second embodiment, a cutting blade mounting angle θ2, which is a small angle among angles formed between an extended line L2 at a blade side edge of the cutting blade C in a mounted state and the longitudinal edge at one side of the cutter main body base portion 311, is formed larger than the first inserting angle θ1. The cutting blade mounting angle θ2 increases a contact area with the belt B and allows the belt B to be easily cut.

The first belt guide portion 313 is connected to the belt inserting portion 312 and inclined inward from a flat surface of the belt cutter main body 310 to guide a first cut belt b1. A first guide inclined surface 313a is extended from the cutting blade C and forms an inclined surface and guides the first cut belt b1 so that the belt B is cut and easily discharged outward.

The locking portion 314 is formed by being bent in a "ㄱ" shape at one side of the belt cutter and having an open one end so that the locking portion 314 may be lock-coupled to an outer object. Since the user easily lock-couples the external object to the locking portion 314 to increase the portability, the belt cutter 300 according to the second embodiment according to the second embodiment may be rapidly used.

The cutting blade support cover 320 includes a second belt guide portion 323 having a second guide inclined surface 323b to guide a second cut belt b2. The second belt guide portion 323 is formed to be inclined at a side opposite to the first belt guide portion 313 with the cutting blade C as the center.

According to the second embodiment, an inclination angle formed between a longitudinal axis of the first belt guide portion 313 and a longitudinal axis of the second belt guide portion 323 is formed larger than an angle of a point section at the blade side of the cutting blade C. Therefore, the cut belts b1 and b2 may be efficiently and easily opened and separated from each other.

As shown in the sectional view of the enlarged portion in FIG. 15, the guide inclination angle θ4 formed between the longitudinal axis of the first belt guide portion 313 and the longitudinal axis of the second belt guide portion 323 is formed larger than the angle θ3 of the point section at the blade side of the cutting blade C. Therefore, the cut belts b1 and b2 may be easily separated from each other.

Hereinbelow, a method for using the emergency escape kit 1, 2 above described will be described.

Figure 16:
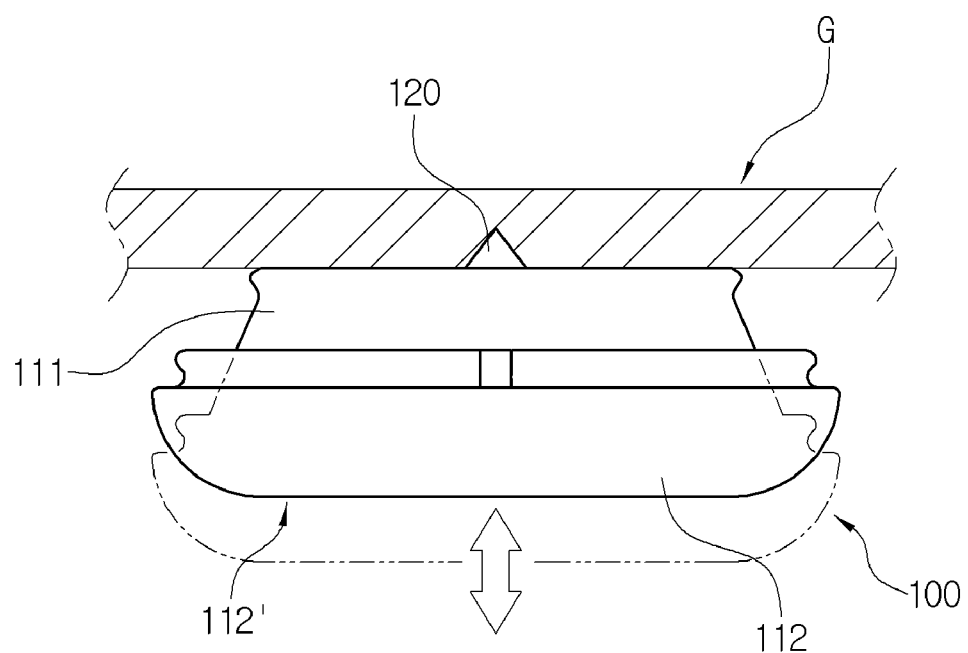
FIG. 16 is an operational state view showing the emergency escape punch separated from the emergency escape kit in FIG. 1.
Figure 17:
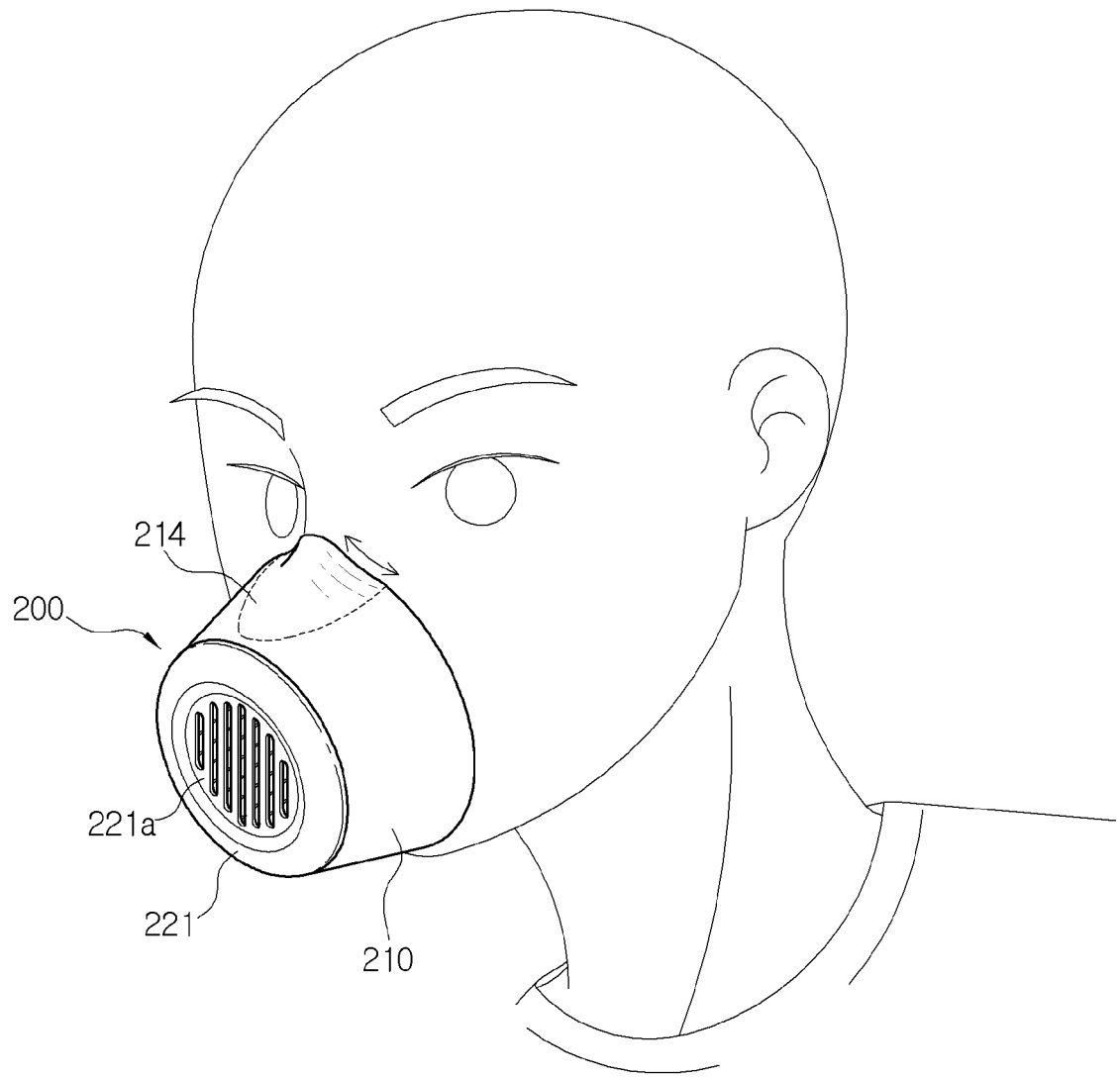
FIG. 17 is an operational state view showing the gas mask separated from the emergency escape kit in FIG. 1.
Figure 18:
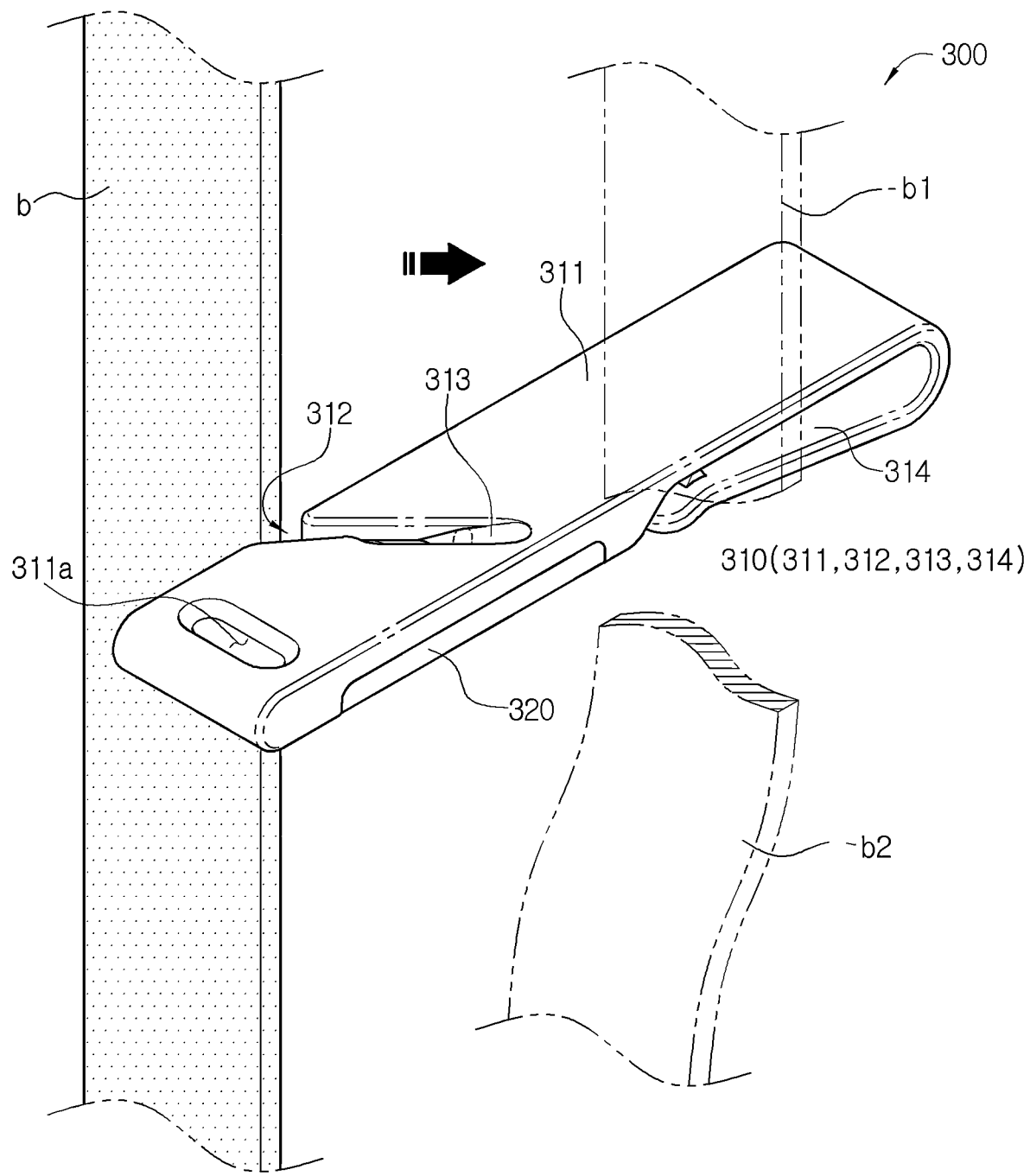
FIG. 18 is an operational state view showing the belt cutter in FIG. 12.

FIG. 16 is an operational state view showing the emergency escape punch separated from the emergency escape kit in FIG. 1. FIG. 17 is an operational state view showing the gas mask separated from the emergency escape kit in FIG. 1. FIG. 18 is an operational state view showing the belt cutter in FIG. 12.

The user may carry the emergency escape kit 1, 2 of the present disclosure as an integrated kit. Therefore, the portability of the emergency escape kit may be improved.

However, as described above, when an emergency event like fire occurs, the emergency escape punch 100, the gas mask 200, and the belt cutter 300 are used after being separated from each other.

As shown in FIG. 16, the separated emergency escape punch 100 may be operated such that the obstacle contact portion 111c is brought into close contact with the obstacle and the pressure portion 112' is pressurized to shatter the obstacle. As shown in FIG. 17, the gas mask 200 may be brought into close contact with the respiratory organ of the user to prevent the user from breathing incoming external poisonous gas.

As shown in FIG. 18, the belt cutter 300 may cut the belt B such as a vehicle seat belt by inserting the belt into the belt inserting portion 312. The cut belt is easily separated into the first belt b1 and the second cut belt b2 while passing through the first belt guide portion 313 and the second belt guide portion 323 to allow the user to easily escape.

The belt cutter 300 has the cutting blade mounting portion CP provided for the cutting blade C to be mounted. The belt cutter 300 includes the belt cutter main body 310 cutting the belt B with high rigidity such as a vehicle seat belt by the cutting blade C during an emergency event, and the cutting blade support cover 320 coupled to the belt cutter main body 310 and supporting the cutting blade C.

The belt cutter main body 310 includes the cutter main body base portion 311, the belt inserting portion 312, the first belt guide portion 313, and the locking portion 314.

The cutter main body base portion 311 has the cutting blade mounting portion CP to stably support the cutting blade.

The belt inserting portion 312 is formed by being recessed at one side of the cutter main body base portion 311 so that the belt B may be inserted thereinto toward the cutting blade C. The belt inserting portion 312 according to the embodiment is formed by being recessed on the longitudinal edge of the cutter main body base portion 311, and includes the first inserting slope 312a and the second inserting slope 312b.

The first inserting slope 312a is formed to be inclined at the first inserting angle θ1 that is a small angle among angles formed between one longitudinal edge of the cutter main body base portion 311 and the initial inserting direction of the belt B in order to determine that the initial inserting angle of the belt B intersects the longitudinal axis L1 of the cutter main body base portion 311. Accordingly, the user can easily insert the belt B that causes a malfunction thereof during a vehicle accident into the belt inserting portion 312.

The second inserting slope 312b is connected to the first inserting slope 312a, has the second inserting width d2 larger than the first inserting width d1 that is the minimum inserting width of the first inserting slope 312a, and is formed by being recessed so that the cutting blade C protrudes outward. Accordingly, as the space receiving the belt B inserted through the first inserting slope 312a is widened, even when the belt B overlaps due to an external force transmitted to the belt, the overlapping belt B may be received in the belt inserting portion 312, and the belt B may be easily cut by the inclined cutting blade C.

In order to cut the belt B, the belt B is moved from the first inserting passage 312a to the second inserting passage 312b. The first inserting passage 312a is formed such that the width thereof is gradually reduced from the initial insertion width. In other words, initial insertion of the belt B may be easily performed due to the large insertion width at the initial insertion, and the belt B is aligned to be easily cut due to the gradually reduced insertion width.

The first inserting width d1 that is the minimum width of the width of the first inserting passage 312a is formed narrower than the second inserting width d2 of the second inserting passage 312b, so that the structure serves to efficiently align the belt B. The aligned belt B may be easily cut by the cutting blade C protruding from the second inserting passage 312b. In addition, the second inserting width d2 of the second inserting passage 312b is formed wider than the first inserting width d1 to provide a space where the belt B may be received even when the belt B is rapidly inserted and overlaps.

With the cutting blade C according to the second embodiment, the cutting blade mounting angle θ2, which is a small angle among angles formed between the extended line L2 at the blade side edge of the cutting blade C in a mounted state and the longitudinal edge at one side of the cutter main body base portion 311, is formed larger than the first inserting angle θ1. The cutting blade mounting angle θ2 increases a contact area with the belt B and allows the belt B to be easily cut.

The first belt guide portion 313 is connected to the belt inserting portion 312 and inclined inward from the flat surface of the belt cutter main body 310 to guide the first cut belt b1. The first guide inclined surface 313a is extended from the cutting blade C and forms the inclined surface and guides the first cut belt b1 so that the belt B is cut and easily discharged outward.

The locking portion 314 is formed by being bent in the "a" shape at one side of the belt cutter and having the open end so that the locking portion 314 may be lock-coupled to an external object. Since the user easily lock-couples the external object to the locking portion 314 to increase the portability of the emergency escape kit, the belt cutter 300 according to the second may be rapidly used.

The cutting blade support cover 320 includes the second belt guide portion 323 having the second guide inclined surface 323b to guide the second cut belt b2. The second belt guide portion 323 is formed to be inclined at a side opposite to the first belt guide portion 313 with the cutting blade C as the center.

According to the second embodiment, the inclination angle formed between the longitudinal axis of the first belt guide portion 313 and the longitudinal axis of the second belt guide portion 323 is formed larger than the angle of the point section at the blade side of the cutting blade C. Therefore, the cut belts b1 and b2 may be efficiently and easily opened and separated from each other.

As shown in the sectional view of the enlarged portion in FIG. 15, the guide inclination angle θ4 formed between the longitudinal axis of the first belt guide portion 313 and the longitudinal axis of the second belt guide portion 323 is formed larger than the angle θ3 of the point section at the blade side of the cutting blade C. Therefore, the cut belts b1 and b2 may be easily separated from each other.

According to the embodiments configured and operated as described above, the emergency escape kit having the single and compact structure has the emergency escape punch and the gas mask efficiently coupled to each other, wherein the emergency escape punch shatters the obstacle such as a glass of a vehicle or a building for the user to escape when an emergency event such as fire occurs in a vehicle or a building and the gas mask filters a poisonous gas to minimize an injury due to the poisonous gas. Accordingly, the portability of the emergency escape kit may be improved.

As described above, the present disclosure is not limited to the embodiments disclosed above, and those skilled in the art will appreciate that various modifications, equivalents, additions, and substitutions are possible, without departing from the scope and spirit of the present disclosure. Therefore, the modifications, equivalents, additions, and substitutions are within the claims of the present disclosure.

The invention claimed is:

1. An emergency escape kit comprising:
an emergency escape punch having an obstacle contact portion configured to be in contact with an obstacle including a glass window, and configured to shatter the obstacle by pressurizing a side of the emergency escape punch opposite to the obstacle contact portion located between the obstacle and the side of the emergency escape punch; and
a gas mask configured to be couplable to or separable from the emergency escape punch, wherein when the gas mask is coupled to the emergency escape punch, the gas mask shields a portion of the emergency escape punch from an outside of the emergency escape punch, and when the gas mask is separated from the emergency escape punch and is brought into contact with a respiratory organ of a user, the gas mask prevents external poisonous gas from flowing into the respiratory organ of the user,
wherein the emergency escape punch comprises:
a punch main body;
a hammer provided inside the punch main body and configured to partially protrude toward the obstacle when a side of the hammer opposite to the obstacle is pressurized; and
a hammer support elastic body coupled to the hammer and configured to support the hammer to allow the hammer to perform a take back operation such that the hammer is projected toward the obstacle and is automatically returned to an inside of the punch main body.

2. The emergency escape kit of claim 1, wherein the gas mask comprises:
a gas mask main body having an emergency escape punch receiving space therein to receive a portion of the emergency escape punch, wherein when the gas mask main body is coupled to the emergency escape punch, the gas mask main body receives a portion of the emergency escape punch in the emergency escape punch receiving space, the gas mask main body being made of an elastic material so as to receive the respiratory organ of the user and to be in contact with a face portion of the user when the gas mask main body is separated from the emergency escape punch and is brought into contact with the respiratory organ of the user; and
a poisonous gas filtering module removably coupled to the gas mask main body and configured to perform filtering of the poisonous gas.

3. The emergency escape kit of claim 2, wherein the poisonous gas filtering module comprises:
an upper filter housing having a contact frame connected to the gas mask main body to block inflow of external fluid;
a lower filter housing providing a poisonous gas filter receiving space receiving a poisonous gas filter configured to filter the poisonous gas, the lower filter housing being coupled to the upper filter housing; and
a water-soluble substance receiving bag arranged between the poisonous gas filter and the upper filter housing and receiving a water-soluble substance.

4. The emergency escape kit of claim 3, wherein the upper filter housing comprises:
an external air flow frame arranged adjacent to an outside flat surface of the poisonous gas filter, and formed by perforating the upper filter housing so that external air flows inward through the poisonous gas filter and internal air flows outward through the poisonous gas filter;
a protruding pin formed by protruding from the external air flow frame toward the lower filter housing while being spaced apart from the water-soluble substance receiving bag, the protruding pin being configured to cut the water-soluble substance receiving bag when the external air flow frame is pressurized from the outside; and
an upper coupling frame connected to both the contact frame and the external air flow frame and having a recessed locking portion formed by being recessed to be lock-coupled to the lower filter housing.

5. The emergency escape kit of claim 4, wherein the lower filter housing comprises:
a lower coupling frame having a protruding lock area formed by protruding toward the recessed locking portion and lock-coupled to the recessed locking portion, and having the poisonous gas filter receiving space therein; and
an internal air flow frame connected to the lower coupling frame in a direction that intersects a longitudinal direction of the lower coupling frame and having an internal air flow portion for ventilation of the internal air.

6. The emergency escape kit of claim 5, wherein the lower filter housing further comprises:
a main body coupling portion formed by protruding outward in a multi-stepped shape from the lower coupling frame and coupled to the gas mask main body.

7. The emergency escape kit of claim 6, wherein the gas mask main body comprises:
- a first protrusion formed by protruding toward the poisonous gas filtering module and lock-coupled to the poisonous gas filtering module;
- a second protrusion formed by protruding from an end of the gas mask main body at the emergency escape punch toward a center inside the emergency escape punch receiving space and lock-coupled to the emergency escape punch; and
- a third protrusion formed by protruding from a portion between the first protrusion and the second protrusion toward the center inside the emergency escape punch receiving space.

8. The emergency escape kit of claim 1, wherein the punch main body comprises:
- an upper punch housing having a hammer discharge through hole configured to guide the obstacle contact portion and the hammer; and
- a lower punch housing coupled to the upper punch housing and having a pressure portion configured to pressurize the hammer so as to discharge a portion of the hammer to the outside.

9. The emergency escape kit of claim 8, wherein the hammer comprises:
- a conical portion formed in a conical shape such that one side thereof protrudes outward from the punch main body through the hammer discharge through hole; and
- a cylindrical portion formed in a cylindrical shape and connected to the conical portion.

10. The emergency escape kit of claim 9, wherein the cylindrical portion comprises:
- a first cylindrical portion having a cylindrical section of a surface area smaller than an area of a lower surface of the conical portion; and
- a second cylindrical portion having a cylindrical section of a sectional area smaller than a sectional area of the first cylindrical portion.

11. The emergency escape kit of claim 10, wherein the upper punch housing comprises:
- a hammer finger stop located adjacent to the conical portion and lock-supporting the lower surface of the conical portion.

12. The emergency escape kit of claim 1, further comprising:
- a belt cutter connected to the emergency escape punch and having a cutting blade to cut a belt including a vehicle seat belt during an emergency event.

13. The emergency escape kit of claim 12, wherein the belt cutter comprises:
- a belt cutter main body having a cutting blade mounting portion to which the cutting blade is mounted; and
- a cutting blade support cover coupled to the belt cutter main body to support the cutting blade.

14. The emergency escape kit of claim 13, wherein the belt cutter main body comprises:
- a cutter main body base portion;
- a belt inserting portion formed by being recessed on one side of the cutter main body base portion so that the belt can be inserted toward the cutting blade;
- a first belt guide portion having an inclined surface formed adjacent to the belt inserting portion and being configured to guide a cut first belt, and the cutting blade support cover comprises:
- a second belt guide portion provided to be opposed to the first belt guide portion with a flat surface of the cutter main body base portion as a center, and configured to guide a cut second belt.

\* \* \* \* \*